Aug. 11, 1942.　　　S. MENDELSOHN　　　2,292,893
SYNCHRONIZER
Filed June 6, 1939　　　2 Sheets-Sheet 1
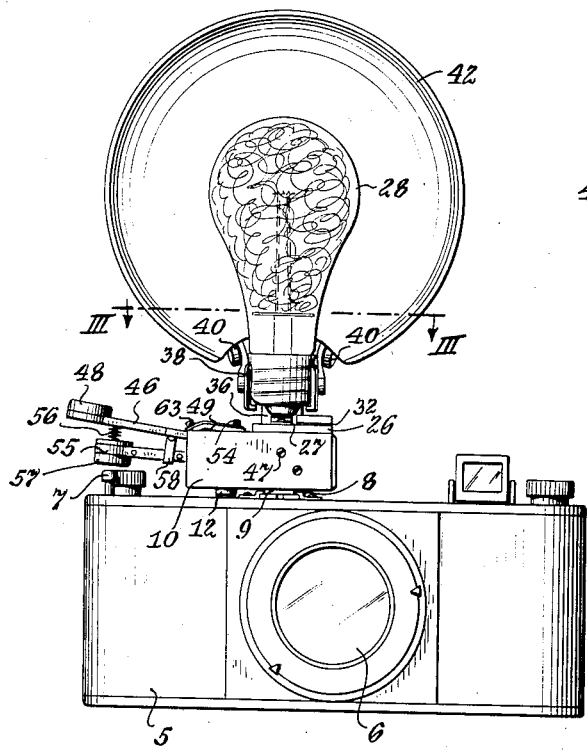
Fig. 1.
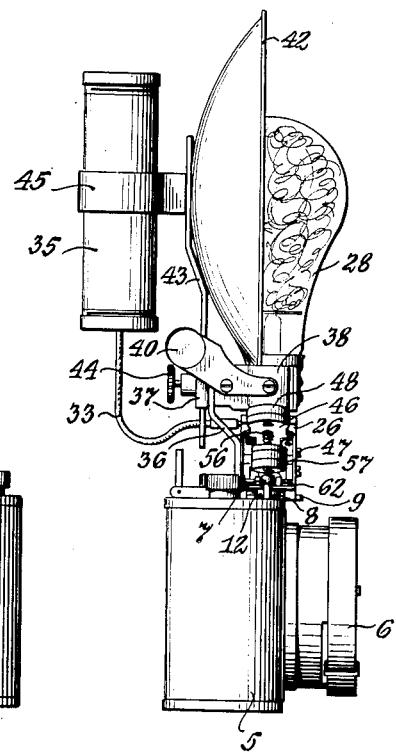
Fig. 2.
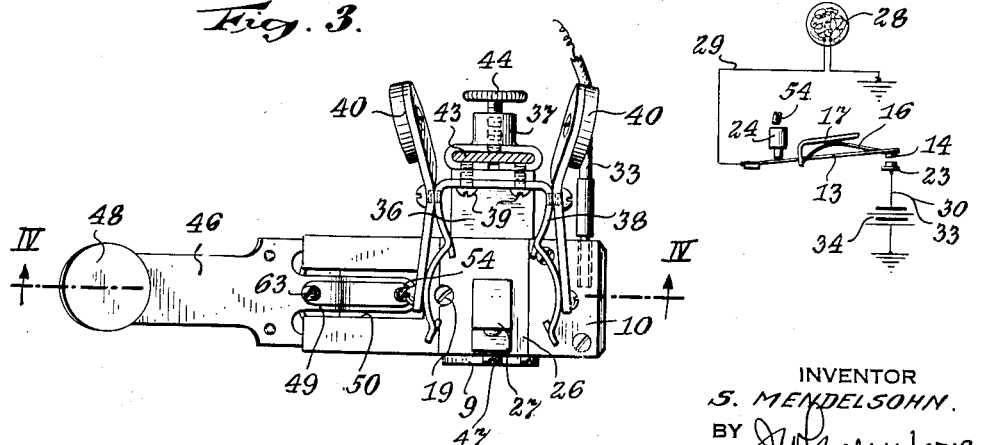
Fig. 3.
Fig. 8.
INVENTOR
S. MENDELSOHN.
BY
ATTORNEY Aug. 11, 1942.   S. MENDELSOHN   2,292,893
SYNCHRONIZER
Filed June 6, 1939   2 Sheets-Sheet 2

INVENTOR
S. MENDELSOHN.
BY
ATTORNEY

Patented Aug. 11, 1942

2,292,893

UNITED STATES PATENT OFFICE 2,292,893

SYNCHRONIZER

Samuel Mendelsohn, Brooklyn, N. Y.

Application June 6, 1939, Serial No. 277,640

2 Claims. (Cl. 67—29)

The present invention relates to a synchronizer for photographic cameras and particularly to a synchronizing mechanism which is readily adaptable to a camera wherein the shutter is opened by depression of a button carried by the camera.

Synchronizing apparatus is well known in the photographic art for causing the opening of a camera shutter simultaneously with the moment of peak intensity from a photo-flash lamp. In order to accomplish the desired result it is essential that the camera shutter open a short period after initiation of combustion within the photoflash lamp since there is a slight time lag before the moment of peak intensity is reached.

Heretofore, such mechanism has been somewhat elaborate and costly requiring numerous relays and wiring or lengthy mechanical connections necessitating in most instances installation of the synchronizing mechanism on the camera at the factory.

It is accordingly an object of the present invention to provide a synchronizing apparatus of simple and compact construction which can be readily installed on a camera by the purchaser.

Another object of the present invention is the provision of a synchronizing apparatus which can be readily installed and which is particularly adaptable to cameras of the type wherein opening of the camera shutter follows contacting of a push button.

Another object of the present invention is the provision of a synchronizing apparatus which is entirely mechanical in its operation and once set in motion it performs its cycle of operation automatically and in predetermined and precise sequence.

A further object of the present invention is the provision of a synchronizing apparatus particularly adaptable to cameras of the type wherein opening of the camera shutter follows contacting of a push button and wherein the apparatus is quickly and simply adjusted for photoflash lamps of different size with the insertion and removal of lamps being greatly facilitated due to the novel manner of supporting the same.

Still further objects of the present invention will become obvious to those skilled in the art by reference to the accompanying drawings, wherein:

Fig. 1 is a front elevational view of a camera to which the synchronizing apparatus of the present invention is attached;

Fig. 2 is a side elevational view of the camera and attached synchronizing apparatus shown in Fig. 1;

Fig. 3 is a sectional view taken on the line III—III of Fig. 1;

Fig. 8 is a diagrammatic illustration of the electrical circuit for energizing the photoflash lamp.

Figure 4:
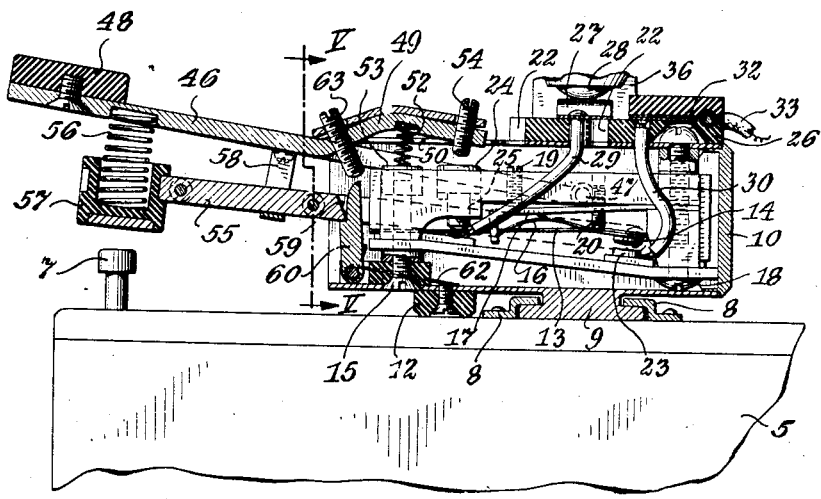
Fig. 4 is a sectional view taken on the line IV—IV of Fig. 3.

Referring now to the drawings in detail a camera 5 is shown in Fig. 1 which is of a type well known in the art under the trade name of "Contax" wherein the camera shutter 6 is opened by depression of a button 7. Inasmuch as the camera per se forms no part of the present invention further description thereof is deemed unnecessary.

A bracket 8 is secured to the top of the camera 5 and the synchronizing apparatus is provided with a grooved extension 9 which slidably engages the bracket 8. As can be more readily appreciated from Fig. 4, the synchronizing apparatus is provided with a casing 10 from which the extension 9 protrudes and also secured to the casing is an annular projection or the like 12 resting on the camera to balance the synchronizing apparatus to prevent undue strain on the bracket 8 during operation of the apparatus.

Mounted within the casing 10 is a quick make and break switch mechanism such as is known to the art as a "microswitch." Such mechanism comprises a movable arm 13 carrying a contact terminal 14 at one end and secured at its other end to the casing by means of a screw or the like 15. The movable arm 13 is biased by a leaf spring 16 secured to the movable arm and to a bracket 17, the latter of which is secured at one end to the casing by means of a screw or the like 18.

The free end of the bracket 17 is held in a desired position by a set screw 19 and in a similar manner a set screw 20 bears against the free end of the movable arm 13 so that upon adjustment of these set screws through openings 22 provided in the casing 10, the desired bias is given to the leaf spring 16. In order to cause a snap movement of the arm 13 and momentary contact of the terminal 14 with a stationary terminal 23, a plunger 24 reciprocates in a slot 25 within the casing which plunger is depressed in a manner hereinafter described.

An insulating block 26 is mounted upon the top of the casing 10 and carries a contact 27 adapted to be engaged by the center contact of a photoflash lamp 28 (Figs. 1 and 2) and a conductor 29 connects the movable arm 13 and its contact terminal 14 with the lamp terminal 27. A conductor 30 also connects the stationary contact terminal 23 with a connecting strip 32 carried by the insulating block 26 and this connecting strip 32 is in turn connected by a detachable conductor 33 to dry cell batteries 34 (Fig. 8) housed within a metallic battery case 35.

For the purpose of supporting the photoflash lamp and battery case assembly, the casing is provided with an upwardly projecting offset bracket 36 (Figs. 2 and 3) having an elliptical guide way piece 37 and a bifurcated spring clamp 38 secured thereto such as by screws or the like 39 (Fig. 3). As will be seen from Figs. 1 and 2 the spring clamp 38 is just high enough above the photoflash lamp terminal 27 as to firmly grip the shell portion of the photoflash lamp and by gripping of finger pieces 40 the clamp is spread against the tension of the clamp to facilitate the ready insertion and removal of a photoflash lamp 28 following each camera exposure.

To direct the illumination from the photoflash lamp a reflector 42 is carried by an elongated metallic strip 43 slidably engaging the elliptical guide way piece 37 and after adjusting the reflector in the guide piece for any particular size photoflash lamp it is locked in place by a knurled headed hand screw 44. Secured to the elongated strip 43 is a bracket 45 having an annular portion which surrounds the metallic battery case 35 and although forming a firm contact therewith nevertheless permits sliding engagement of the battery case with the bracket 45. Inasmuch as the battery case 35 is of metal, as is the bracket 45, strip 43 and spring clamp 38, and one side of the batteries 34 are grounded to the case 35, these members form a grounded conductor for completing a circuit to the photoflash lamp, as shown in Fig. 8, upon closure of the "microswitch."

In order to operate the switch as well as the camera shutter the casing 10 is provided with an arm 46 pivoted at 47 and having a thumb contact button 48 as shown more clearly in Fig. 4. This arm is also provided with a bent portion 49 protruding above the upper surface of the casing 10 through a slotted opening 50 (Fig. 3) provided in the casing. To maintain the arm 46 in its uppermost position, as shown in Fig. 4, and the "microswitch" in its open position, a coil spring 52 rests within a recess on the underside of the arm and bears against a block 53 which forms a nut for the screw 15.

An adjustable set screw 54 extends through the bent portion 49 of the arm 46 immediately above the reciprocating plunger 24 so that upon depression of the thumb button 48 the arm is moved downwardly until the set screw 54 contacts the plunger forcing it downward. This movement of the plunger applies a slight force to the movable arm 13 and since very little force is required due to the adjustment of the bracket 17 and leaf spring 16 the arm 13 moves with a snap action causing engagement of the contact terminals 14 and 23 thus closing the circuit to the photoflash lamp 28.

It is necessary, however, in order to take a photograph having the requisite contrast and definition that the camera shutter be completely open at the precise moment that the photoflash lamp reaches its peak illumination intensity. To this end the apparatus of the present invention is provided with a further pivoted arm 55 secured to the casing 10 and disposed immediately below the arm 46. A coil spring 56 rests in a recess provided on the underside of the arm 46 and also within a cup-shaped contact piece 57 carried by the arm 55 immediately above the camera shutter control button 7, with a bifurcated bracket 58 preventing the coil spring 56 from forcing the arms 46 and 55 too far apart.

Figure 6:
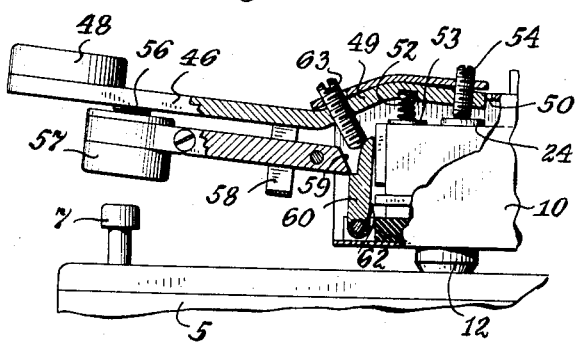
Fig. 6 is a fragmentary sectional view of the apparatus shown in Fig. 4 in one of its positions during operation.
Figure 5:
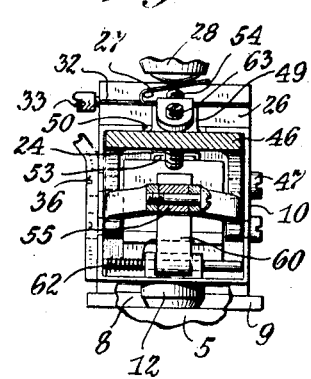
Fig. 5 is a fragmentary sectional view taken on the line V—V of Fig. 4.
Figure 7:
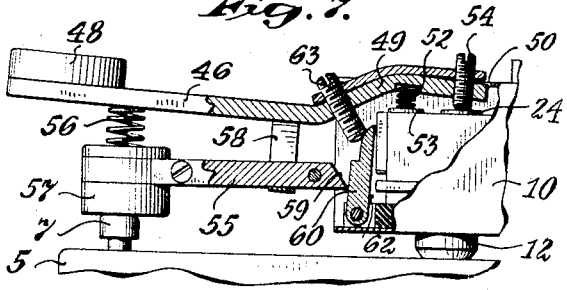
Fig. 7 is a view identical to Fig. 6 but showing a still further position of the apparatus during its operation.

As will be noted from Fig. 4, in the normal position of both arms 46 and 55 the arm 55 has an angular portion 59 which engages a pivoted dog 60 biased by a coil spring 62 (Fig. 2) maintaining the contact piece 57 in spaced relation with the shutter control button 7. The arm 46 is provided with an adjusting screw 63 similar to that of the adjusting screw 54 which, due to its angle, contacts the dog 60 and rides along its arcuate surface as the arm is moved downwardly, as shown in Fig. 6. Since the lower arm 55 cannot move downwardly, due to its engagement with the dog 60, potential energy is stored in the coil spring 56 until further depression of the arm 46 causes the adjusting screw 63 to force the dog out of engagement with the portion 59 of the arm 55. When this occurs the potential energy stored in the coil spring 56 causes the arm 55 to move downwardly with a snap action and engage the camera shutter button 7 thus opening the camera shutter 6.

It will be noted that upon depression of the button 48 with downward movement of the arm 46 the microswitch is first closed causing energization of the photoflash lamp 28. However, there is a known time lag between initial energization of the lamp and its reaching its peak intensity which time lag can be definitely determined for each manufacturer's lamps. This being determined it is only necessary to adjust the two set screws 54 and 63 so that the dog 60 will be moved in ample time to allow the arm 55 to contact the camera shutter button 7 and open the shutter following initial closing of the "microswitch" which latter is regulated by the set screw 54. By making this time lag identical to that between initial energization of the photoflash lamp and its moment of peak intensity, the complete opening of the camera shutter will be precisely synchronized therewith.

It will thus be seen by those skilled in the art that a synchronizing apparatus is herein provided which is simple of construction and which can readily be installed on a camera by the average photographer eliminating the necessity for factory installation. Moreover, the apparatus is readily adjustable to photoflash lamps of various sizes and once the apparatus is started in its operation it automatically completes its cycle in proper timed sequence. A further feature resides in the fact that other than energizing of the photoflash lamp it is entirely mechanical in its operation with no wearing parts which alter the adjustment of the apparatus.

Although one specific embodiment of the present invention has been shown and described it is to be understood that other modifications thereof may be made without departing from the spirit and scope of the appended claims.

What is claimed is:

1. The combination with a camera provided with a shutter trigger on the camera case and a viewfinder clip adjacent thereto, of a synchronizing apparatus for causing complete opening of the camera shutter simultaneously with the moment of peak intensity from a photoflash lamp, comprising a casing detachably engaging the viewfinder clip of said camera, a photoflash lamp and a source of electrical energy therefor carried by said casing, switching means carried by said casing and operable upon closure thereof to cause energization of said lamp from said source, a lever arm pivoted at one end to said casing and movable about its pivot to cause closure of said switching means with attendant energization of said photoflash lamp from said source, a second lever arm pivoted at one end to said casing normally in substantial alignment with said first mentioned lever arm and adapted to rotate about its pivot until the free end thereof contacts the shutter trigger on the camera case to cause opening of said shutter, a lock engaging said second lever arm to normally prevent movement thereof, a member carried by said first mentioned lever arm and engageable with said lock upon movement of said first mentioned lever arm a predetermined distance to release said second lever arm for movement about its pivot, and potential energy storage means connected to said second lever arm and operable upon release of said lock to rotate said second lever arm about its pivot until the free end thereof contacts the shutter trigger on the camera case with attendant opening of the camera shutter in synchronism with the moment of peak intensity from said photoflash lamp.

2. The combination with a camera provided with a shutter trigger on the camera case and a viewfinder clip adjacent thereto, of a synchronizing apparatus for causing complete opening of the camera shutter simultaneously with the moment of peak intensity from a photoflash lamp, comprising a casing detachably engaging the viewfinder clip of said camera, a photoflash lamp and a source of electrical energy therefor carried by said casing, switching means carried by said casing and operable upon closure thereof to cause energization of said lamp from said source, a lever arm pivoted at one end to said casing and movable about its pivot into engagement with said switching means to cause closure thereof with attendant energization of said photoflash lamp from said source, a second lever arm pivoted at one end to said casing normally in substantial parallel relation and in the same vertical plane as said first mentioned lever arm and adapted to rotate about its pivot until the free end thereof contacts the shutter trigger on the camera case to cause opening of said shutter, a lock engaging said second lever arm to normally prevent movement thereof, an adjustable member carried by said first mentioned lever arm and engageable with said lock upon movement of said first mentioned lever arm to switch closing position to release said second lever arm for movement about its pivot, and a spring disposed between said lever arms for storing potential energy therein upon initial movement of said first mentioned lever arm to switch closing and lock releasing position, and operable to rotate said second lever arm about its pivot until the free end thereof contacts the shutter trigger on the camera case with attendant opening of the camera shutter in synchronism with the moment of peak intensity from said photoflash lamp.

SAMUEL MENDELSOHN.